(12) United States Patent  
Sidhom et al.

(10) Patent No.: US 8,451,999 B2  
(45) Date of Patent: May 28, 2013

(54) INTERACTIVE COMMUNICATION SESSION DIRECTOR

(75) Inventors: Nashwa F Sidhom, Edison, NJ (US); Henry Tam, Brooklyn, NY (US); Euclid Brooks, Laurel, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1304 days.

(21) Appl. No.: 11/611,424

(22) Filed: Dec. 15, 2006

(65) Prior Publication Data

US 2008/0144798 A1 Jun. 19, 2008

(51) Int. Cl. *H04M 3/42* (2006.01)
(52) U.S. Cl. USPC .................................. 379/211.02; 379/93.34
(58) Field of Classification Search USPC ............................................ 379/211, 211.03 See application file for complete search history.

(56) References Cited

U.S. PATENT DOCUMENTS

| | | | | |
|---|---|---|---|---|
| 5,754,630 A | * | 5/1998 | Srinivasan | 379/88.23 |
| 6,041,114 A | * | 3/2000 | Chestnut | 379/211.02 |
| 7,254,226 B1 | * | 8/2007 | Roberts et al. | 379/215.01 |
| 7,450,701 B2 | * | 11/2008 | Crockett et al. | 379/93.23 |
| 7,734,031 B1 | * | 6/2010 | Goodman et al. | 379/221.08 |
| 2001/0048738 A1 | | 12/2001 | Baniak et al. | |
| 2002/0085701 A1 | * | 7/2002 | Parsons et al. | 379/211.01 |
| 2002/0146112 A1 | * | 10/2002 | Larson et al. | 379/356.01 |
| 2002/0187777 A1 | | 12/2002 | Osterhout et al. | |
| 2003/0108176 A1 | | 6/2003 | Kung et al. | |
| 2005/0152527 A1 | | 7/2005 | Kent, Jr. et al. | |
| 2006/0203986 A1 | | 9/2006 | Gibson | |

OTHER PUBLICATIONS

"Intelligent Call Forwarding Services", Covansys Corporation, copyright 2006, http://www.convansys.com/what/intelgnt_call_frwd.htm.

"Call Forwarding", Verizon Corporation, printed Jul. 2006, http://www22.verizon.com/foryourhome/sas/sas_con_longdescription.aspx.

* cited by examiner

*Primary Examiner* — Amal Zenati (57) ABSTRACT

A system and method may include processing of a signaling message, that includes a called number, requesting establishment of a communication session to the called number, determining that the called number is associated with an account comprising a member profile having an active forward-to number, and generating signals for producing an announcement associated with the account. The system and method may further include receiving a response to the announcement, and determining whether the response is associated with the member profile having the active forward-to number.

25 Claims, 4 Drawing Sheets

FIG. 1

| Member 202 | Forwarding Status 204 | Active forward-to Number 206 | Forward to Number n = 1 208A | ... | Forward to Number n = M 208M |
|---|---|---|---|---|---|
| 1 | Y/N | n | (NPA) Nxx-xxx | ... | (NPA) Nxx-xxx |
| 2 | Y/N | n | (NPA) Nxx-xxx | ... | (NPA) Nxx-xxx |
| 3 | Y/N | n | (NPA) Nxx-xxx | ... | (NPA) Nxx-xxx |
| 4 | Y/N | n | (NPA) Nxx-xxx | ... | (NPA) Nxx-xxx |
| 5 | Y/N | n | (NPA) Nxx-xxx | ... | (NPA) Nxx-xxx |

INTERACTIVE COMMUNICATION SESSION DIRECTOR

BACKGROUND INFORMATION

The family home telephone number remains the primary contact number for many individuals. Many individuals, however, have become very mobile and often spend many hours outside the home. Being away from home may cause these individuals to miss important calls.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method according to an exemplary embodiment may provide processing of a signaling message, that includes a called number, requesting establishment of a communication session to the called number, determining that the called number is associated with an account including a member profile having an active forward-to number, and generating signals for producing an announcement associated with the account. The system and method may further include receiving a response to the announcement, and determining whether the response is associated with the member profile having the active forward-to number.

The description below provides a discussion of servers, computers, and other devices that may perform one or more functions, which may be implemented using software, firmware, hardware, and/or various combinations thereof. It is noted that a function described herein as being performed at a particular device may be performed at one or more other devices instead of or in addition to the function performed at the particular device. Further, the devices may be local or remote to one another.

Figure 1:
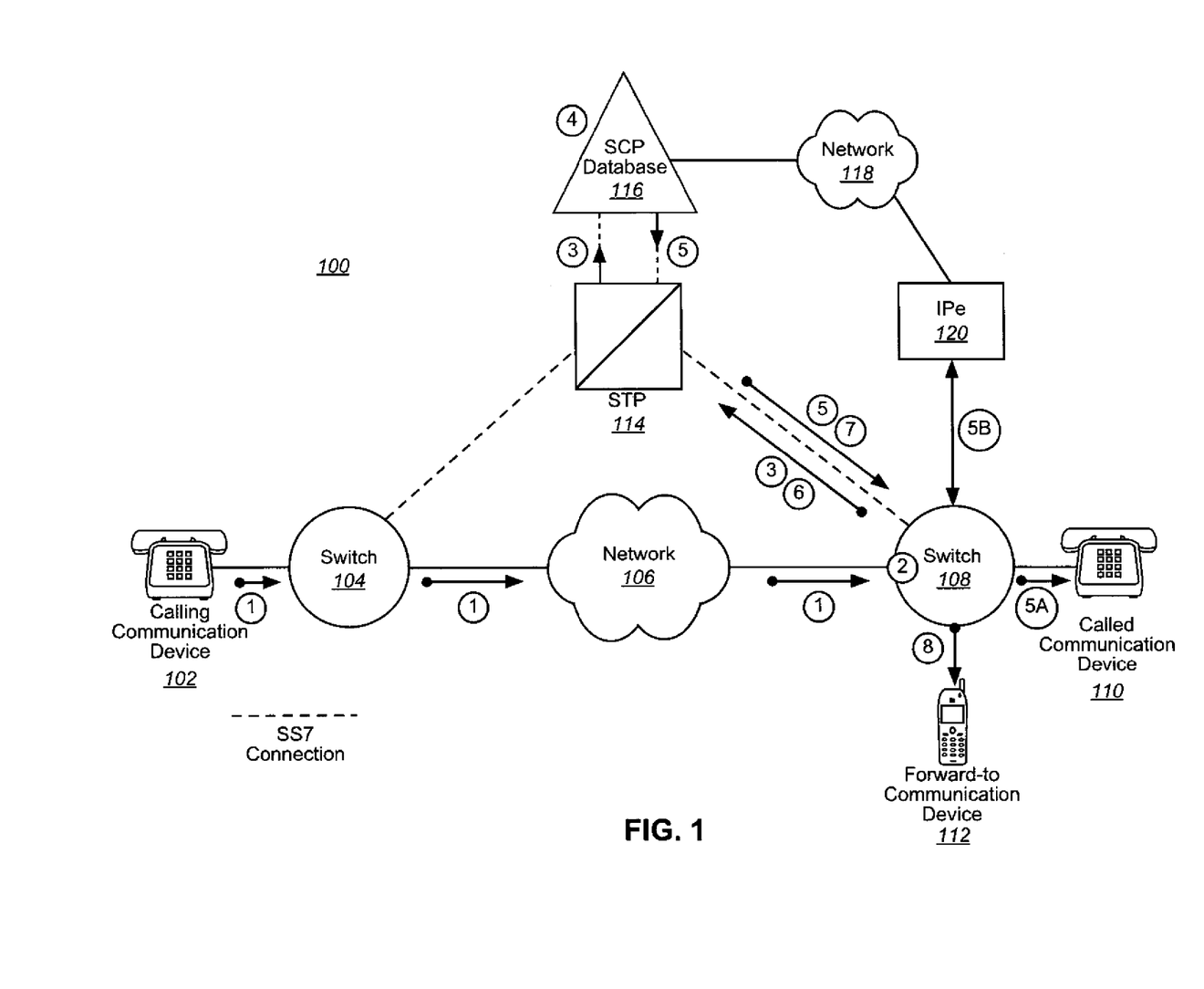
FIG. 1 illustrates an exemplary system for implementing an interactive communication session director, according to an exemplary embodiment.

FIG. 1 illustrates an exemplary system 100 for implementing an interactive communication session director, according to an exemplary embodiment. It is noted that other devices may be included in FIG. 1, and devices shown may be integrated and/or separated. Numbers 1-8 are included in FIG. 1 to illustrate call flow and communication between the various devices.

The system 100 may be an interactive forwarding service in which a caller may dial a number to reach an individual at a called number, and in response, the system 100 may prompt the caller to input a response indicating which individual the caller is attempting to reach. Based on the response and on a forwarding status of the individual the caller is attempting to reach, the system 100 may seamlessly connect the caller either to the called number or to a forward-to number designated by the individual the caller is attempting to contact. To accomplish this, each member of a group of users may specify one or more forward-to numbers and whether each forward-to number is active.

When a signaling message is received requesting establishment of a communication session, the system 100 may intelligently direct and route the communication session to either the called number or to a forward-to number, thus increasingly the likelihood that the communication session will be forwarded to the most appropriate communication device for contacting the user. For example, family members or members of a business who share a single telephone number, but also have personal telephone numbers, may instruct the system 100 to establish communication sessions to contact a particular member based on who the caller is attempting to reach. The caller may dial the shared telephone number, and the system 100 may determine whether to forward the call to a forward-to number, such as forwarding a call to a cell phone instead of a home phone, whether the member is at or away from home or business, or to route the call to the called number.

The system 100 may permit users to create an interactive communication session director account. A user or group of users may become members by setting up the interactive communication session director account. The interactive communication session director may associate a group contact number for contacting members of the group, and may allow members to specify other personal and/or group numbers as forward-to numbers. The group contact number and/or the forward-to number may be a telephone number, an Internet Protocol (IP) address, data network address, email address, textual message address, and/or other numbers or addresses for establishing a communication session permitting multiple devices to communicate voice and/or data in real-time and/or in non-real-time. For example, the interactive communication session director account may associate a single shared telephone number with one or more members (e.g., family members, business number, etc.), and also may permit each of the members to identify one or more other numbers where each member may be reached. The system 100 may use the interactive communication session director account in determining whether to use the group contact number received from a caller or a forward-to number of a member profile for routing a communication session based on information included in a member profile.

Figure 2:
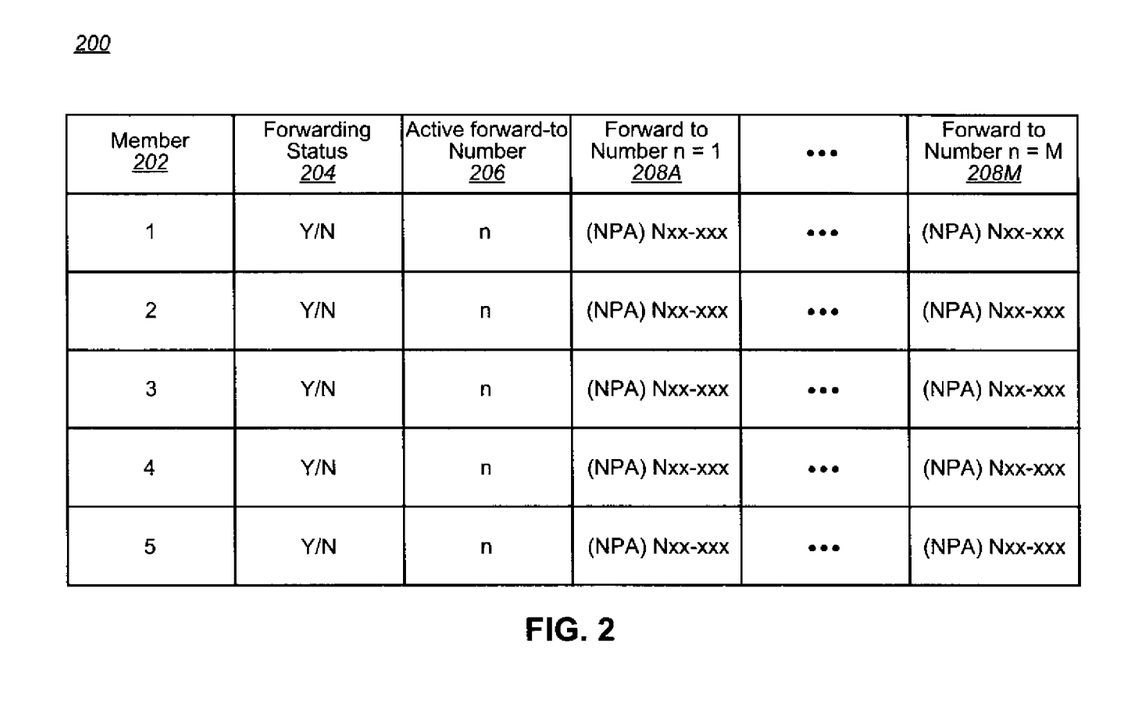
FIG. 2 illustrates an exemplary table of an interactive communication session director account, according to an exemplary embodiment.

Each member may create a member profile in the interactive communication session director account specifying one or more forward-to numbers and whether one or more of the forward-to numbers are active. The interactive communication session director account may comprise one or more member profiles stored in a database of Service Control Point 116. The database of the Service Control Point 116 may store one or more interactive communication session director accounts. FIG. 2 illustrates an exemplary table 200 of an interactive communication session director account, according to an exemplary embodiment. Once a user or group of users creates an interactive communication session director account, the Service Control Point 116 may receive information to establish a member profile for each member. In the member profile, each member (e.g., family member, employee, etc.) may specify information for determining whether to forward calls to a forward-to number instead of routing the call to a group contact number. Each row in the table 200 of FIG. 2 may correspond to a member profile. The member column 202 illustrates members profiles for five members (i.e., members 1-5), however, the interactive communication session director account may include greater or fewer members.

The forwarding status column 204 may permit each member to specify whether forwarding is active. Each member profile may indicate either "yes" if forwarding is active for that member, or "no" if call forwarding is not active. Each member also may specify in the member profile certain time periods, dates, time intervals, etc., during which forwarding is active for a particular forward-to number. Each member additionally may specify in the member profile that calls may be broadcast to all of their forward-to numbers. When forwarding is active, the system 100 may route communication sessions to the called member based on the forward-to number instead of the group contact number. For example, if a particular member has selected to have his or her calls forwarded to a forward-to number, the system 100 may forward calls to the forward-to number before a switch generates an alerting signal (e.g. ring, music, etc.) at the communication device associated with the called number.

The active forward-to number column 206 may indicate which of the forward-to numbers in columns 208A-M is the active forward-to number. The active forward-to number may be the number used to route the communication session when forwarding is active. The forward-to number n=1 208A to forward-to number n=M 208M may list M different numbers to which the communication session may be forwarded individually or broadcast. For example, member 1 may indicate that n=2 in the active forward-to number column 206, and if call forwarding is active, calls to member 1 may be forwarded to the forward-to number n=2 listed in the forward-to number column 208 instead of the called group contact number. Member 1 also may indicate that n=2 in the active forward-to number column 206 during a first time period, and that n=3 during another time period. For example, member 1 may specify n=2 during 8:30 am-5:00 pm, and n=3 during the remainder of the day. Numbers included in the forward-to number column 208 may include telephone numbers, Internet Protocol (IP) addresses, data network addresses, email addresses, other numbers or addresses of a communication device, and/or combinations thereof. For example, FIG. 2 illustrates numbers in the form of (NPA) Nxx-xxx, where NPA may refer to a number plan area (e.g., area code), N may represent any number from 2-9, and x may represent any number from 0-9.

Additionally, if the forward-to number column 208 includes a textual message address (e.g., email address, text message address, etc.) and the forwarding status column 204 indicates that the textual message address is active, whenever a signaling message requesting establishment of a voice communication session is received, the system 100 may inform the caller that a voice communication session may not be established and may automatically forward a textual message to the textual message address to inform the member that the caller attempted to contact the member. The system 100 may include in the textual message: a name of the calling party; a time and/or date of the signaling message; a phone number or address of the calling party; other information associated with the communication session or with the caller; and/or combinations thereof.

Members may update the member profiles through a telephony interface or through a web interface. For example, a member may call a telephone number for updating the member profile. The telephony interface may prompt the member to enter a member identification code to verify and authenticate the caller. Once authenticated, the telephony interface may permit the member to input digits, to speak, and/or combinations thereof, to update the member profile. The member also may use the Internet or other data network to access a website for updating the member profile. The web interface may additionally prompt the user for the member identification code to verify and authenticate the caller before updating the member profile.

Using a telephone (e.g., touch tone telephone) or the Internet, each member may individually activate or deactivate call forwarding of their personal calls, update a forward-to number in the member profile, update which forward-to number is active, indicate during which times a forward-to number is active, activate/deactivate textual message notification of when a caller attempted to reach the member, add/delete/modify a forward-to number, etc. One or more of the authenticated members also may update a custom greeting announcement (e.g., record a new message, upload a new message, etc.) that may be produced to prompt the caller to enter information to select which member the caller desires to contact, as will be discussed in further detail below.

After a member or group of members establish an interactive communication session director account, the system 100 may receive signaling messages for establishing a communication session with a communication device associated with the member. The system 100 also may receive signaling messages from users attempting to reach called parties that have not set up an interactive communication session director account. To establish a communication session, a user may dial a called number causing a calling communication device 102 to generate telephony signals (e.g., Dual-tone multi-frequency (DTMF) tones), which may be communicated to a Service Switching Point 104 (see also FIG. 1, number 1). The calling communication device 102 may be a telephone, a personal digital assistant (PDA), personal computers, notebook personal computers, laptops, Internet Voice over Internet Protocol (VoIP) phones, cellular phones, satellite phones, any kind of communication or computer device, and/or combinations thereof. The Service Switching Point 104 may receive the telephony signals and may generate a telephony signaling message for signaling another device (e.g., switch, gateway, etc.) communicatively coupled to network 106 to establish a communication session. For example, the telephony signaling message may be a Signaling System 7 Initial Address Message (IAM) for establishing a telephone call over network 106 with Service Switching Point 108. The network 106 may be Plain Old Telephone Service (POTS), a Public Switched Telephone Network (PSTN), other telephony networks, as are well known, and/or combinations thereof. The telephony signaling message may include a called number associated with the called communication device 110 dialed by the user of the calling communication device 102 requesting establishment of a communication session between the calling communication device 102 and the called communication device 110. The telephony signaling message also may include information to identify the calling communication device 102, such as an address or number associated with the calling communication device 102, a time and date of when the telephony signaling message was generated, other information associated with the requesting establishment of a communication session, and/or combinations thereof. The communication session may refer to a connection over one or more telephony and/or data networks for communicating signals (e.g., voice, data, etc.) between various devices and the calling communication device 102.

The Service Switching Point 104 may communicate the telephony signaling message to the network 106, which may route the telephony signaling message to Service Switching Point 108 based on the called number. The Service Switching Point 108 may process the telephony signaling message to determine whether an Interactive Communication Session Director option is associated with the called number. The Interactive Communication Session Director option may indicate that the called number included in the telephony signaling message is a group contact number associated with an interactive communication session director account. For example, the Interactive Communication Session Director option may be an Advanced Intelligent Network termination attempt. If the Service Switching Point 108 determines that the called number is not associated with any Interactive Communication Session Director option, then the Service Switching Point 108 may establish a communication session to the device associated with the called number according to conventional techniques (see FIG. 1, number 5A).

If the Service Switching Point 108 determines that the called number matches a group contact number associated with an Interactive Communication Session Director option, then the Service Switching Point 108 may suspend establishing a communication session to a communication device associated with the called group contact number, and may send a query to the Service Control Point 116 through the Service Transfer Point (STP) 114, which may direct network traffic, to determine a service status of the members associated with the group contact number (see FIG. 1, number 3). For example, the Service Switching Point 108 may suspend establishing a telephone call, and may send a query to the Service Control Point 116 to determine a service status of the members associated with the group telephone number. The Service Control Point 116 may be, for example, an Advanced Intelligent Network Service Control Point and also may include a database for storing one or more interactive communication session director accounts. The Service Switching Point 104, Service Switching Point 108, Service Transfer Point 114, and the Service Control Point 116 may communicate using a telephony signaling protocol, such as Signaling System 7 (SS7), for example.

The service status may indicate whether the member profile of any member has activated session-screening to screen communication sessions based on a calling number or calling address associated with the calling communication device 102. The session-screening may prevent communication sessions from being established to the group contact number and/or to a forward-to number from the screened calling communication device 102. The service status also may screen calling communication devices 102 if the number or address is unrecognized. For example, the database of the Service Control Point 116 may store a table of known calling numbers and/or calling addresses. If the calling number or calling address is unrecognized, the Service Control Point 116 may return routing instructions to the Service Switching Point 108 to route the communication session to an Intelligent Peripheral (IPe) 120 to interact with the caller to request that the caller input an identification code before routing the communication session to its destination. The Intelligent Peripheral 120 may prompt the caller to input the identification code and may forward the received identification code to the Service Control Point 116. If the Service Control Point 116 identifies that the received identification code matches an identification code stored in the database of the Service Control Point 116, then the Service Control Point 116 may further examine the service status to determine how to route the communication session. If the Service Control Point 116 does not identify the received identification code, then the Service Control Point 116 may terminate the communication session or may route the communication session to the group contact number.

The service status also may indicate whether call forwarding is active for any member associated with the called group contact number. In response to the query from the Service Switching Point 108, the Service Control Point 116 may examine the database of the Service Control Point 116 and may return an indication in the service status of whether the forwarding status column 204 includes any active forward-to number (i.e., Yes in column 204, see also FIG. 1, numbers 4 and 5). If the service status indicates that forwarding is not active for any member, the Service Control Point 116 may return routing instructions to the Service Switching Point 108 to route the communication session to the group contact number (see FIG. 1, number 5A). For example, the Service Control Point 116 may generate an authorize termination response message instructing the Service Switching Point 108 to complete the call to the called group telephone number.

If the service status indicates that forwarding is active for one or more members, the Service Control Point 116 may return routing instructions to the Service Switching Point 108 to route the communication session to the Intelligent Peripheral (IPe) 120 (see FIG. 1, number 5, 5B). The Service Control Point 116 also may communicate with the Intelligent Peripheral 120 via Network 118. For example, the Network 118 may be a shared TCP/IP network linking the Service Control Point 116 to the Intelligent Peripheral 120, and/or to other systems and devices that may use the TCP/IP protocol. The Network 118 may be used when certain service features requires the use of the TCP/IP protocol, such as updating the interactive communication session director account, for example.

The Intelligent Peripheral 120 may store custom greeting announcements that are associated with the group contact number. The members may create the custom greeting announcement when setting up the interactive communication session director account. The routing instructions received from the Service Control Point 116 may include the group contact number, and, once the routing instructions are received, the Intelligent Peripheral 120 may identify the custom greeting announcement based on the group contract number. The Intelligent Peripheral 120 may then generate signals for producing the custom greeting announcement at the calling communication device 102 prompting the user of the calling communication device 102 to input a response. The Intelligent Peripheral 120 may generate digital and/or analog signals that may produce, at the calling communication device 102, an audible announcement, a visual announcement, a textual announcement, and/or combinations thereof. The response to the custom greeting announcement may be, for example, speech, typed text, Dual-tone multi-frequency tones, other types of input, and/or combination thereof. For example, the custom greeting announcement may be a recorded message for the members of the group (e.g., "Hi, you've reached the Jackson family. If you would like to reach Mary, please press 1, for Michael press 2, for Mark press 3, for other family members please stay on the line."). The custom greeting announcement may prompt the user of the calling communication device 102 to press or speak a certain number to reach a specific member. Once the caller inputs the response to the custom greeting announcement, the Service Switching Point 108 may forward the response to the Intelligent Peripheral 120 (see FIG. 1, number 5B). The Intelligent Peripheral 120 may receive the response and may forward the response to the Service Control Point 116 (see FIG. 1, number 6).

Depending on the response, the Service Control Point 116 may return routing instructions to the Service Switching Point 108 to forward the communication session to a stored forward-to number or to complete the call to the called group contact number. If the response does not correspond to a member having an active forward-to number as indicated in the member profile (see, e.g., FIG. 2, column 204), the Service Control Point 116 may instruct the Service Switching Point 108 to route the communication session based on the called group contact number (see FIG. 1, number 5A). For example, the Service Switching Point 108 may route a telephone call to communication device 110 associated with a called group telephone number. If the response corresponds to a member with an active forward-to number, the Service Control Point 116 may instruct the Service Switching Point 108 to route the communication session to a forward-to communication device 112 associated with the active forward-to number (see FIG. 1, number 8). For example, the Service Switching Point 108 may route a telephone call to forward-to communication device 112 associated with the forward-to number instead of to called communication device 110 associated with the called group contact number. In a further example, if the forward-to address is a textual address and the signaling message requests establishment of a voice communication session, the Service Control Point 116 may instruct the Intelligent Peripheral 120 to generate a message informing the caller that a voice communication session may not be established and may automatically forward a textual message to the textual message address to inform the member that the caller attempted to contact the member. The Intelligent Peripheral 120 also may prompt the caller to determine if the caller wishes to terminate the communication session or to be routed to the group contact number.

Once the communication session is established between the calling communication device 102 and the called communication device 110 or the forward-to communication device 112, the calling communication device 102 and the called communication device 110 or the forward-to communication device 112 may exchange, via the communication session, analog, digital, video, voice signals, and/or combinations thereof. Signals may include digital data (e.g., Internet Protocol packets, frames, cells, etc.) and/or telephony signals (e.g., voice signals, call establishment signals, Signaling System 7 signals, etc.). The communication session may transport signals via a telephone call, a Session Initiation Protocol dialog, a Voice over Data (VoD) call, a Voice over IP (VoIP) call, other systems for transporting digital and/or voice signals over one or more networks as are well known, and/or combinations thereof.

Thus, the system 100 may interact with a caller to determine which number to use (i.e., forward-to number, called number) when routing a communication session to a called party based on who the caller is attempting to reach. The system 100 may intelligently route the communication session without requiring any interaction with any person at a called communication device associated with a called group contact number unless the member profile of the member to be reached indicates not to forward the communication session to a forward-to number.

The system 100 also may permit each member to independently control which number is used to connect callers trying to reach a particular member, and may route communication sessions to a forward-to number when a member is away from the location associated with the group contact number. Members also may independently activate/deactivate forwarding by modifying their respective member profiles. The system 100 may permit a member to forward communication sessions by determining which member the caller is attempting to contact, rather than on the called number. The system 100 also advantageously may forward communication sessions based on the called party and not on the calling party. Moreover, the system 100 may advantageously determine whether the communication session is to be routed to a destination communication device before completing routing of the communication session to the communication device associated with the called group contact number, and may redirect the communication session without requiring any person at the communication device associated with the called group contact number to answer. The system 100 also may advantageously suspend establishing a communication session before a communication is established to the called communication device. Communication forwarding may hence be initiated before receiving a no-answer condition at the called communication device, which may not involve a called party (other than the member the caller is attempting to contact) from having to answer the called communication device and also may save time by not requiring the caller to wait for a no-answer condition at the called communication device before forwarding the communication session to a forward-to communication device. The system 100 also may accommodate both active and inactive call forwarding conditions simultaneously for members.

Figure 3:
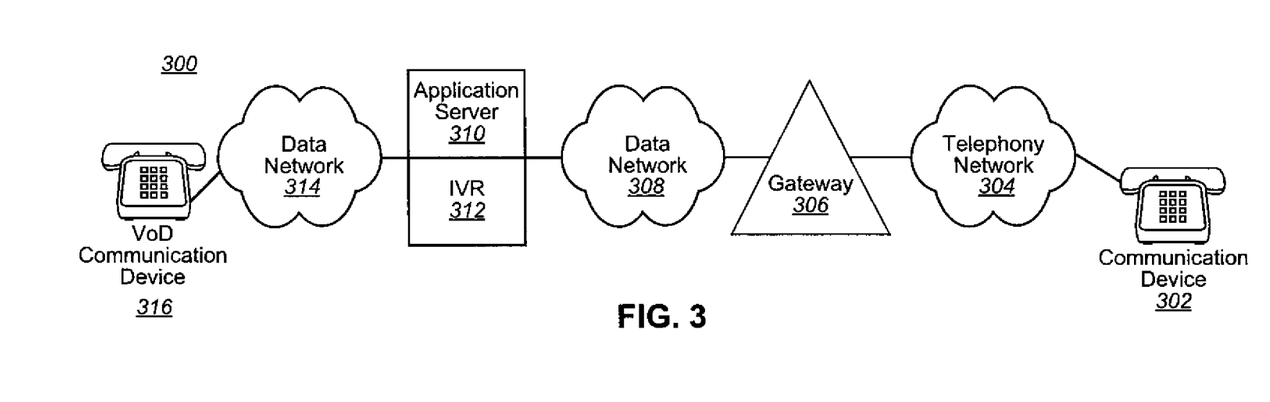
FIG. 3 illustrates an exemplary system for establishing a communication session to a Voice over Data (VoD) communication device, according to an exemplary embodiment.
Figure 4:
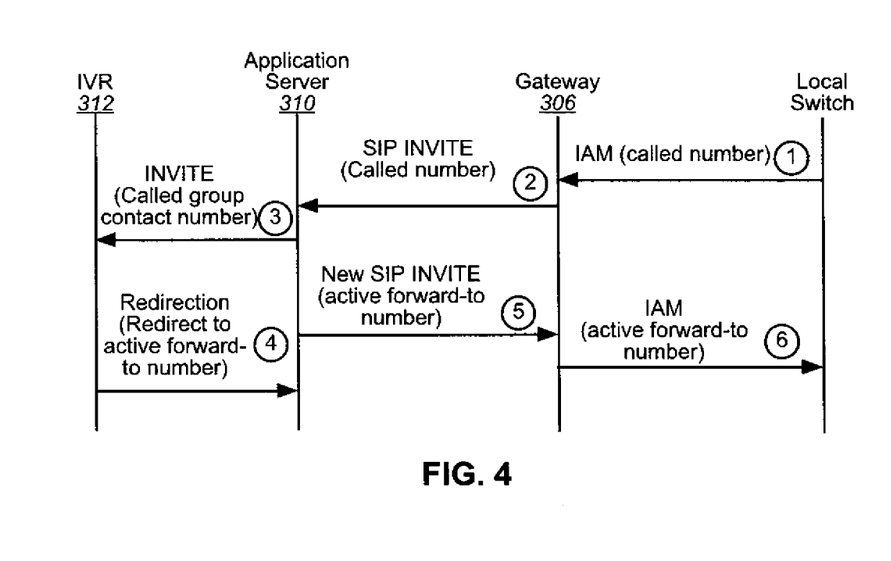
FIG. 4 illustrates communication flow between various devices of FIG. 3, according to an exemplary embodiment.

The principles described above also may be employed in a Voice over Data (VoD) network call. FIG. 3 illustrates an exemplary system 300 for establishing a communication session to a Voice over Data communication device 316, according to an exemplary embodiment. FIG. 4 includes numbers 1-6 to illustrate communication flow between various devices of FIG. 3. It is noted that FIG. 3 is exemplary, and the system 300 may include other devices local and/or remote to one another, and the functions described as being performed at a particular device may be performed at other devices instead of or in addition to being preformed at the particular device.

Initially, a user or group of users may establish an interactive communication session director account with a telecommunications provider, and each member may create a member profile, as discussed above. An interactive voice response (IVR) system 312 may store the interactive communication session director account and each member profile. The interactive voice response system 312 also may receive Dual-tone multi-frequency updates to member profiles and a Web server (not shown) may receive member profile updates via the Internet. The interactive voice response system 312 and the Web server also may reside in the application server 310, or also may reside on separate servers or at other locations. The application server 310 and the interactive voice response system 312 may process data signaling messages to determine whether to route a communication session based on a called number or to route a communication session based on a forward-to number.

To initiate a communication session, a user may dial a sequence of digits representing a called number at a communication device 302. The dialed sequence of digits may be Dual-tone multi-frequency tones, for example. A switch (not shown) on the telephony network 304 (e.g., Public Switched Telephone Network, Plain Old Telephone Service, etc.) may receive the dialed digits and may generate a telephony signaling message (e.g., Signaling System 7 Initial Address Message) including the called number (also see FIG. 4, number 1), and also may include a number or address of the communication device 302 and/or information associated with the generation of the telephony signaling message (e.g., time, date, etc.). The telephony network 304 may route the telephony signaling message to a gateway 306 (e.g., Public Switched Telephone Network gateway) associated with the communication device 316 based on the called number. Once received, the gateway 306 may convert the telephony signaling message to a data signaling message that is suitable for transport over the data network 308. For example, the data signaling message may be a Session Initiation Protocol (SIP) INVITE message including the called number for establishing a SIP dialog over the data network 308. The gateway 306 may communicate the data signaling message to the application server 310 based on the called number for routing the communication session over the data network 314 (also see FIG. 4, number 2). For communication sessions originating on the data network 308 instead of from the telephony network 304, the communication device 302 may generate the data signaling message and system 100 may not include the gateway 306. For example, the communication device 302 may be a SIP client and may forward a data signaling message including a called number to the application server 310 via data network 308.

Upon receipt of the data signaling message, the application server 310 may process the called number to determine whether an Interactive Communication Session Director option is associated with the called number. The Interactive Communication Session Director option may indicate that the called number is a group contact number associated with an interactive communication session director account. If not associated with an Interactive Communication Session Director option, then the application server 310 may route the communication session over the data network 314 based on the called number permitting the communication device 316 to establish a communication session for communicating with the communication device 302.

If the called number is associated with the Interactive Communication Session Director option, the application server 310 may then determine a service status of the member profiles for the interactive communication session director account associated with the Interactive Communication Session Director option. The service status may indicate if any member profile contains an active forward-to number. For example, the application server 310 may store a table similar to that depicted in FIG. 2 and may return an active service status if column 204 includes a yes for any member profile, and may return an inactive service status if column 204 includes a no for each member profile. The service status also may screen communication sessions from various calling communication devices and/or from unrecognized numbers and/or addresses, as discussed above. If the service status indicates that no members have an activate forward-to number, then the application server 310 may route the communication session based on the called group contact number permitting the communication device 316 to communicate with the communication device 302. The application server 310 also may generate an alerting signal (e.g., ring, music, text, etc.) to alert the user of the called communication device 302 about the established communication session.

If the service status indicates that one or more members have an active forward-to number, then the application server 310 may route the data signaling message to the interactive voice response system 312 (also see FIG. 4, number 3). The interactive voice response system 312 may generate signals for producing a custom greeting announcement at the communication device 302 prompting the user of the communication device 302 to input a response, as discussed above. Once the user of the communication device 302 inputs the response, the interactive voice response system 312 may index a table (e.g., table 200 of FIG. 2) on the application server 310 (or a backend database) based on the response to identify a member profile associated with the response and to determine whether the identified member profile includes an active forward-to number.

If the response is not associated a member having an active forward-to number, then the interactive voice response system 312 may instruct the application server 310 to route the communication session based on the called group contact number permitting the communication device 316 to communicate with the communication device 302.

If the response selects a member having an active forward-to number, then the interactive voice response system 312 may instruct the application server 310 to redirect the communication session to the active forward-to number indicated in the member profile associated with the member (also see FIG. 4, number 4). To do so, the application server 310 may generate and forward a second computer signaling message (e.g., Session Initiation Protocol INVITE request) including the active forward-to number to the gateway 306 over the data network 308 (also see FIG. 4, number 5). The gateway 306 may convert the second computer signaling message into a second telephony signaling message (e.g., Signaling System 7 Initial Address Message) and may forward the second telephony signaling message to the switch associated with the communication device 302 (also see FIG. 4, number 6). The switch may then use the active forward-to number included in the second telephony signaling message to route the communication session to a forward-to communication device (not shown) based on the forward-to number. The forward-to communication device may communicate with the communication device 302 over the communication session via a telephony network, a data network, and/or combinations thereof.

Additionally, if the member profile includes an active forward-to number that is textual message address (e.g., email address, text message address, etc.), the interactive voice response system 312 may inform the caller that a Voice over Data call may not be established to the forward-to communication device, and may generate signals for prompting the caller to select either to speak a message that may be converted into text and forwarded to the member, to forward a textual message (e.g., email, test message, etc.) notifying the member of that the caller attempted to reach the member, or to be connected to the called group contact number to leave a voice message or to speak with another member. The interactive voice response system 312 also may automatically generate and send a textual message (e.g., email, text message, etc.) including information for identifying the caller (e.g., name, phone number, etc,) and information about the data signaling message (e.g., time, date, etc.) if the caller selects not to leave a message (e.g., hangs up, etc.).

Figure 5:
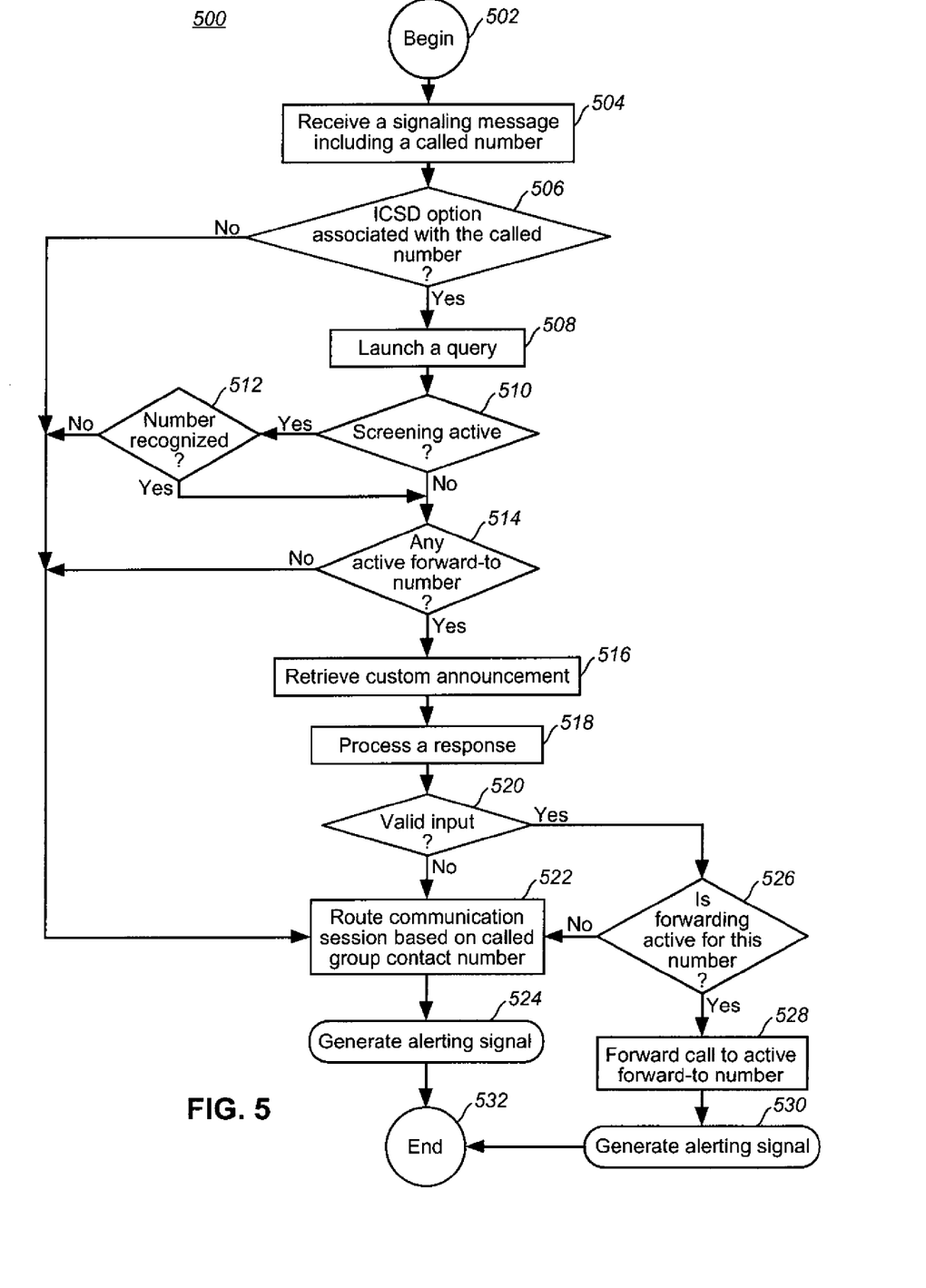
FIG. 5 illustrates an exemplary flow diagram for processing signaling messages and for establishing a communication session, according to an exemplary embodiment.

FIG. 5 illustrates an exemplary flow diagram 500 for processing signaling messages and for establishing a communication session, according to an exemplary embodiment. The flow diagram 500 may begin at 502 and may continue to 504.

In 504, the Service Switching Point 108 may receive a telephony signaling message including a called number and a calling number and/or calling address associated with the calling communication device 102.

In 506, the Service Switching Point 108 may determine whether an Interactive Communication Session Director option is associated with the called number. If no, the flow diagram may continue to 522. If yes, the flow diagram 500 may continue to 508.

In 508, the Service Switching Point 108 may determine that the called number is a group contact number based on the Interactive Communication Session Director option, and may generate and launch a query including the group contact number and the calling number and/or calling address associated with the calling communication device 102 to the Service Control Point 116.

In 510, the Service Control Point 116 may determine whether screening is active for any member of the interactive communication session director account associated with the group contact number. If yes, then the flow diagram 500 may continue to 512. If no, then the flow diagram 500 may continue to 514.

In 512, the Service Control Point 116 may determine whether the calling number and/or calling address associated with the calling communication device 102 is recognized. If recognized, the flow diagram 500 may continue to 514. If not, the Service Control Point 116 may instruct the Intelligent Peripheral 120 to prompt the caller to enter an identification code. If the entered identification code corresponds to a known identification code, then the flow diagram 500 may continue to 514. If not, then the flow diagram 500 may continue to 522. The Service Control Point 116 also may terminate the communication session (not shown).

In 514, the Service Control Point 116 may process the interactive communication session director account including one or more member profiles associated with the group contact number included in the query to determine whether any of the members profiles have an active forward-to number. If no, the flow diagram 500 may continue to 522. If yes, then the flow diagram 500 may continue to 516.

In 516, the Service Control Point 116 may forward routing instructions to the Service Switching Point 108 to route the communication session to the Intelligent Peripheral 120, which may retrieve a custom greeting announcement (e.g., press 1 to speak with Bob, press 2 to speak with Mary, etc.) based on the group contact number and may generate signals for producing the custom greeting announcement at the calling communication device 102.

In 518, the Intelligent Peripheral 120 may receive and process a response to the custom announcement input by a user at the calling communication device 102. The response may identify which member the user is attempting to contact. The Intelligent Peripheral 120 may forward the response to the Service Control Point 116.

In 520, the Service Control Point 116 may determine whether the input response is valid input and may forward routing instructions to the Service Switching Point 108 based on this determination. The input response may be valid if the response is useable to index the interactive communication session director account corresponding to a member profile. If input response is valid, the flow diagram 500 may continue to 526. If the input response is not valid, the Service Control Point 116 may forward routing instructions to the Service Switching Point 108 and the flow diagram 500 may continue to 522. Also, the Service Control Point 116 may instruct the Intelligent Peripheral 120 to replay the announcement if the response is not valid.

In 522, the Service Switching Point 108 may route the communication session to the called communication device 110 associated with the called group contact number based on the routing instructions.

In 524, the Service Switching Point 108 may forward an alerting signal for alerting a user at the called communication device 110 of the communication session. The user may or may not answer, and the communication session may terminate caused by user input at either the calling communication device 102 or at the called communication device 110. For example, the user may hang up a phone, which may send an "on-hook" signal instructing the system 100 to terminate the communication session. The flow diagram 500 may then continue to 532 and end.

In 526, the Service Control Point 116 may process the response to index the table 200 to identify a particular member profile and may determine whether a forward-to number is active for that particular member. If not active for the particular member, then the flow diagram 500 may continue to 522. If active, then the flow diagram 500 may continue to 528.

In 528, the Service Control Point 116 may forward routing instructions instructing the Service Switching Point 108 to forward the communication session based on a forward-to number associated with a forward-to communication device 112. For example, the Service Switching Point 108 may route the communication session to a member's cell phone rather than to a member's home phone.

In 530, the Service Switching Point 108 may forward an alerting signal for alerting a user at the forward-to communication device 112 of the established communication session. The user may or may not answer, and user input at either the calling communication device 102 or at the called communication device 110 may terminate the communication session. For example, the user may hang up a phone, which may send an "on-hook" signal instructing the system 100 to terminate the communication session. The flow diagram 500 may then continue to 532 and end.

Thus, family households with two or more members may use the interactive communication session director service to redirect calls to their desired forward-to number. Two or more people sharing a house, apartment, or dormitory also may take advantage of this service. Additionally, small businesses may use this service in place of an answering service to provide uninterrupted telephone access to its customers. Customers who call the business' main number may hear a greeting and may choose to be forwarded directly to the desired employee. The system 100 implementing the interactive communication session director also may connect customers with employees who are in the office or who are regularly traveling in the field.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising: processing a signaling message, that includes a called number and a calling number, requesting establishment of a communication session to the called number; determining that the calling number is unrecognized; requiring, based on the determination, entry of an identification code from a caller prior to routing the communication session; determining whether the identification code is acceptable; if the identification code is not acceptable, routing the call to a group contact number; if the identification code is acceptable; determining, using a service control point, that the called number is associated with an account including a member profile having an active forward-to number; generating signals for producing an announcement associated with the account; receiving a response to the announcement; and determining whether the response is associated with the member profile having the active forward-to number.

2. The method of claim 1, further comprising routing the communication session based on the called number if the response is not associated with the member profile having the active forward-to number.

3. The method of claim 1, further comprising routing the communication session based on the active forward-to number if the response is associated with the member profile having the active forward-to number.

4. The method of claim 1, wherein the member profile indicates that the active forward-to number is active during a particular time interval.

5. The method of claim 1, wherein the response corresponds to a particular member of a plurality of members.

6. The method of claim 1, wherein the member profile is stored in a table in a database.

7. The method of claim 6, wherein the table stores a plurality of member profiles.

8. The method of claim 1, wherein the member profile may store a plurality of forward-to numbers.

9. The method of claim 1, wherein the called number comprises an email address, a textual message address, an Internet Protocol address, a data network address, or a telephone number.

10. The method of claim 1, wherein determining that the called number is associated with the account further comprises identifying an Interactive Communication Session Director option associated with the called number.

11. The method of claim 10, wherein the Interactive Communication Session Director option comprises an advanced intelligent network Interactive Communication Session Director option.

12. The method of claim 1, further comprising generating and forwarding a textual message including information on a caller and/or associated with the signaling message.

13. The method of claim 1, wherein the signaling message includes a calling number.

14. The method of claim 13, further comprising screening the communication session based on the calling number.

15. A non-transitory computer readable media comprising code to perform the acts of the method of claim 1.

16. A system comprising: a switch to receive a signaling message comprising a called number and a calling number, to identify an Interactive Communication Session Director option associated with the called number, and to generate a query, the signaling message requesting establishment of a communication session; a service control point communicatively coupled to the switch, the service control point being configured to receive the query and to store an account comprising a member profile having an active forward-to number, the service control point being further configured to process the query and to return routing instructions for routing the communication session, wherein the service control point is further configured to determine that the calling number is unrecognized and to require, based on the determination, entry of an identification code from a caller prior to routing the communication session; wherein the service control point is further configured to determine whether the identification code is acceptable, and if the identification code is not acceptable, to route the call to a group contact number; and an intelligent peripheral communicatively coupled to the switch and/or to the service control point, the intelligent peripheral being adapted to, if the identification code is acceptable, communicate signals via the communication session for producing an announcement, to process a response to the announcement, and to forward the response to the service control point, wherein the service control point receives the response from the intelligent peripheral and determines whether the response is associated with the member profile having the active forward-to number.

17. The system of claim 16, wherein the service control point further comprises a database.

18. The system of claim 16, wherein the member profile indicates that the active forward-to number is active during a particular time interval.

19. The system of claim 16, wherein the service control point instructs the switch to route the communication session based on the called number if the response is not associated with the member profile having the active forward-to number.

20. The system of claim 16, wherein the service control point instructs the switch to route the communication session based on the active forward-to number if the response is associated with the member profile having the active forward-to number.

21. The system of claim 16, wherein the service control point generates and forwards a textual message including information on a caller and/or associated with the signaling message.

22. A system comprising: an application server to receive a Session Initiation Protocol (SIP) signaling message comprising a called number and a calling number, to identify an Interactive Communication Session Director option associated with the called number, and to generate a query, the signaling message requesting establishment of a communication session, wherein the application server is further configured to determine that the calling number is unrecognized and to require, based on the determination, entry of an identification code from a caller prior to routing the communication session; wherein the application server is further configured to determine whether the identification code is acceptable, and if the identification code is not acceptable, to route the call to a group contact number; an interactive voice response system communicatively coupled to the application server, the interactive voice response system being configured to receive the query and to store an account comprising a member profile having an active forward-to number, the interactive voice response system being further configured to, if the identification code is acceptable, process the query and to communicate signals via the communication session for producing an announcement and to process a response to the announcement, the interactive voice response system being further configured to determine whether the response is associated with the member profile having the active forward-to number.

23. The system of claim 22, wherein the interactive voice response system instructs the application server to generate and forward a textual message including information on a caller and/or associated with the signaling message.

24. The system of claim 22, wherein the interactive voice response system instructs the application server to route the communication session based on the called number if the response is not associated with the member profile having the active forward-to number.

25. The system of claim 22, wherein the interactive voice response system instructs the application server to route the communication session based on the active forward-to number if the response is associated with the member profile having the active forward-to number.

* * * * *